US008728246B2

(12) United States Patent
Varrin, Jr. et al.

(10) Patent No.: US 8,728,246 B2
(45) Date of Patent: May 20, 2014

(54) METHOD AND COMPOSITION FOR REMOVING DEPOSITS

(75) Inventors: Robert D. Varrin, Jr., Reston, VA (US);
Michael J. Little, Ashburn, VA (US);
Carly E. Anderson, Bellaire, TX (US)

(73) Assignee: Westinghouse Electric Company, LLC, Cranberry Township, PA (US)

( * ) Notice: Subject to any disclaimer, the term of this patent is extended or adjusted under 35 U.S.C. 154(b) by 0 days.

(21) Appl. No.: 13/139,173

(22) PCT Filed: Jan. 26, 2010

(86) PCT No.: PCT/US2010/022022
§ 371 (c)(1),
(2), (4) Date: May 7, 2012

(87) PCT Pub. No.: WO2011/093849
PCT Pub. Date: Aug. 4, 2011

(65) Prior Publication Data
US 2012/0279522 A1    Nov. 8, 2012

(51) Int. Cl.
*B08B 9/00* (2006.01)
(52) U.S. Cl.
USPC ...................... 134/22.17; 134/22.1
(58) Field of Classification Search
None
See application file for complete search history.

(56) References Cited

U.S. PATENT DOCUMENTS

| 5,154,197 | A |   | 10/1992 | Auld et al. |
|---|---|---|---|---|
| 5,413,168 | A |   | 5/1995 | Baum |
| 5,575,863 | A | * | 11/1996 | Sala et al. ................. 134/2 |
| 5,858,118 | A |   | 1/1999 | Shah et al. |
| 6,099,655 | A |   | 8/2000 | Farr et al. |
| 6,540,943 | B1 | * | 4/2003 | Treybig et al. ............ 252/391 |
| 6,585,825 | B1 |   | 7/2003 | Skee |
| 6,841,125 | B1 |   | 1/2005 | Chartier et al. |
| 7,063,800 | B2 | * | 6/2006 | Ding et al. ................. 216/90 |
| 7,427,330 | B1 | * | 9/2008 | Zuck et al. ................ 134/26 |
| 2004/0149310 | A1 | * | 8/2004 | Varrin et al. ................ 134/3 |
| 2005/0048768 | A1 | * | 3/2005 | Inoue et al. ............. 438/629 |
| 2007/0164258 | A1 |   | 7/2007 | Emerson et al. |
| 2009/0165818 | A1 |   | 7/2009 | Smith et al. |
| 2009/0281017 | A1 | * | 11/2009 | Suzuki et al. ............ 510/176 |
| 2011/0151671 | A1 | * | 6/2011 | Barr et al. .............. 438/695 |

FOREIGN PATENT DOCUMENTS

| WO | 03/000464 A2 | 1/2003 |
|---|---|---|
| WO | 03/104900 A2 | 12/2003 |
| WO | 2004/044266 A1 | 5/2004 |
| WO | 2005/097689 A1 | 10/2005 |

OTHER PUBLICATIONS

International Search Report and Written Opinion as issued for International Application No. PCT/US2010/022022, dated Mar. 12, 2010.
International Preliminary Report on Patentability, including Written Opinion of the International Searching Authority, as issued for PCT/US2010/022022, dated Aug. 9, 2012.
Search Report in related European Application No. 10165815 mailed May 10, 2011.

* cited by examiner

*Primary Examiner* — Nicole Blan
(74) *Attorney, Agent, or Firm* — Westinghouse Electric Company, LLC

(57) ABSTRACT

The present invention provides methods and compositions useful for conditioning and removing solid deposits that have formed on or otherwise accumulated within one or more components including, for example, scale formed within a steam generating system. The aqueous cleaning compositions incorporate one or more quaternary ammonium hydroxides characterized by $pK_a$ values no less than about 13.5. These quaternary ammonium hydroxides may be used alone or in combination with one or more additives including, for example, chelating agents, reducing or oxidizing agents, pH adjustment agents, surfactants, corrosion inhibitors, complexing agents, dispersants and combinations thereof.

15 Claims, No Drawings

METHOD AND COMPOSITION FOR REMOVING DEPOSITS

CROSS REFERENCE TO RELATED APPLICATIONS

This is the U.S. National Phase of PCT/US2010/022022, filed Jan. 26, 2010 which is incorporated by reference herein in its entirety.

BACKGROUND OF THE INVENTION

1. Field of the Invention

The methods and compositions described below are useful for conditioning and removing solid deposits that typically incorporate a mixture of metallic and semimetallic oxides including, for example, scale deposits formed on surfaces within a steam generating system. The methods and compositions are not, however, limited to scale and will also be useful for removing deposits incorporating a wide range of mixtures of metallic and semimetallic compounds including, for example, anhydrous or hydrated oxides and/or hydroxides singly or in combination with nitrates, sulfates, carbonates and/or phosphates that have accumulated within tubing, pipes, vessels and/or other components. The particular mix of compounds present within any particular deposit depends on a number of factors including, for example, the source water composition, treatment chemistries added to the source water, the composition of the components and the conditions under which the system is operated.

2. Description of the Background Art

It is well known that various impurities, introduced into steam generating systems, give rise to solid deposits that form on the surface of components of such systems particularly including components involved in higher temperature operations including, for example, heat exchangers, steam generators and turbines. The presence of such solids, typically including a mixture of metallic and semimetallic compounds as noted above are variously described as scale, deposits, or sludge depending on their characteristics and location within the steam generating system. Despite efforts to reduce such deposits by controlling the cycles of concentration within the systems and chemical additives incorporated in the circulating fluid, scale and other deposits continue to be a concern in most, if not all, steam generating systems.

The particular terms used to the describe the deposits notwithstanding, the accumulation of such compounds on surfaces and within vessels may have various adverse effects on steam generating system operation, including: (1) decreasing heat transfer to the secondary coolant within the steam generator, resulting in loss of heat exchange efficiency, (2) clogging or partial clogging of flow passages in tube supports or other internal steam generator structures, (3) promoting under-deposit corrosion, which leads to accelerated local corrosion of the affected surfaces such as the tubes in a shell-and-tube steam generator, and (4) imparting high stresses on steam generator components. The deposit-induced stresses can result in mechanical deformation and cracking of steam generating equipment components.

Thus, removing such deposits through chemical or mechanical means is desirable and typically achieved through periodic cleaning operations to remove deposits in order to reduce the accumulation of deposits on surfaces of components of the steam generating system. As an alternative to complete removal of deposits, deposits can be treated by conditioning processes. Conditioning of scale, deposits or sludge assists in their removal and fluidization, which is beneficial. Such conditioning may involve softening, partial dissolution, formation of pores, detachment of the solids from the surfaces, or any combination thereof.

Solids deposited in steam generating systems commonly contain primarily iron oxides such as magnetite as a result of typical materials of construction used in steam generating systems and auxiliary systems. However, solids deposited in different parts of steam generating systems may have different compositions. For instance, solids deposited in the lower bundle region of steam generators often have a high content of oxides and hydrated oxides of aluminum and silicon, relative to those present in the upper bundle region. Such oxides and hydrated oxides may include, for instance, boehmite (AlOOH) and silica ($SiO_2$). Deposits containing oxides of aluminum and silicon are also frequently encountered in boilers in fossil fuel plants. Oxides and hydrated oxides of aluminum and silicon tend to act as binding species that consolidate deposits throughout the steam generating system. Thus, deposits containing these species are generally more difficult to dissolve and remove than other common solids found in steam generator deposits, such as magnetite or copper.

Nuclear waste sludge such as that found in long term storage facilities in both the U.S. and internationally, which may receive and accumulate compounds from various processes, can be even more complex and include a mixture of aluminum, sodium, iron, calcium, manganese, bismuth, uranium, silver, copper, zirconium and lanthanum compounds. Representative compounds identified in nuclear waste sludge have included, for example, $Al(OH)_3$, Gibbsite; $(NaAlSiO_4)_6 \cdot (NaNO_3)_{1-6} \cdot 2H_2O$, $NO_3$—Cancrinite; AlO(OH), Boehmite; $NaAl(CO_3)(OH)_2$, Dawsonite; $Fe_2O_3$, Hemtatite; $Ca_5OH(PO_4)_3$, Hydroxylapatite; $Na_2U_2O_7$, Clarkeite; $ZrO_2$, Baddeleyite; $Bi_2O_3$, Bismite; $SiO_2$, Quartz-Silica; $Ni(OH)_2$, Theophrasite; $MnO_2$, Pyrolusite; $CaF_2$, Fluorite; $LaPO_4 \cdot 2H_2O$; $Ag_2CO_3$ and $PuO_2$.

Deposits rich in magnetite and copper, such as those found throughout the steam generators in pressurized water reactor (PWR) nuclear power plants, can be effectively removed using solvents with a high concentration of EDTA, accompanied by hydrazine at near neutral pH (~7) for iron removal or by hydrogen peroxide at weakly basic pH (~9.5) for copper removal. Schneidmiller, D. and Stiteler, D., *Steam Generator Chemical Cleaning Process Development*, EPRI, Palo Alto, Calif., EPRI NP-3009 (1983). However, such solvents are much less effective in the removal of deposits rich in aluminum oxides and silicon oxides, which are typically found at or near tube to tubesheet intersections in a vertically-oriented PWR steam generator, but may also be found in other locations in steam generating systems. (The tubesheet is the bottom surface of the secondary (boiling) side of a vertically-oriented steam generator.)

Generally, two types of cleaning operations are used to remove accumulated deposits from steam generating systems. One type of cleaning operation involves the use of chemical solutions with high concentrations, typically from about 2 to about 15 wt % or more, of solutes. Severa, J. and Bár, J., Handbook of Radioactive Contamination and Decontamination, Elsevier, Amsterdam, 1991. Those skilled in the art will appreciate that while the concentration of the solute used for such processes is, for convenience, typically expressed in terms of wt %, it is well understood that the capacity of the chemical solution is actually a function of the molar concentration of the solute. Such concentrated chemical cleaning methods require extensive time to prepare the temporary equipment system used to implement the cleaning operation, and the required use and disposal of large quantities of chemicals renders the use of such methods very costly.

In contrast, a second type of cleaning operation makes use of solutions at much lower concentrations, typically less than about 0.1 wt % (approximately 1000 ppm), but often up to or slightly above 1 wt % (approximately 10,000 ppm). Such dilute chemical cleaning methods do not require adaptation of large temporary equipment systems to the existing steam generating system to be cleaned, thus making it possible to implement such cleaning processes within a short period, often with little or no impact on other activities planned during regularly-scheduled maintenance outages. In addition, such methods do not require large amounts of chemicals. Accordingly, cleaning operations of this type are much less complicated and much less expensive than more concentrated chemical cleaning methods. Examples of several dilute cleaning methods are discussed below.

Fellers' U.S. Pat. No. 5,779,814 ("Fellers I") and U.S. Pat. No. 6,017,399 ("Fellers II") disclose methods for controlling and removing solid deposits from surfaces of components of a steam generating system by adding to the aqueous phase of the steam generating system one or more volatile amines having a pKa value greater than about 10.61 at 25° C. Such amines were selected from the group consisting of alkyl amines, cycloalkyl amines, and primary, secondary, and tertiary amine derivatives. Dimethylamine (pKa of about 10.61 at 25° C.) is a most preferable member of the group. Pyrrolidine, a cycloalkyl amine with a pKa of about 11.27 at 25° C., is also highly preferred. Other volatile amines which are mentioned in the invention range from mono-N-butylamine (MBNA) with a pH of 10.61 at 25° C. to 1,5-diazabicyclo(5, 4,0)undec-5-ene with a pH of 13.40 at 25° C. The concentration of the amine applied was from about 0.01 ppm to 50 ppm, preferably from about 0.5 ppm to 50 ppm, most preferably from about 0.5 ppm to 10 ppm. This method discloses the addition of such amines to both the aqueous phase used to generate steam during on-line continuous operation of the steam generating system and to an aqueous phase present in the steam generating system when the system is shut down. In practice, such amines have been added to layup solutions present in steam generators during regularly-scheduled maintenance outages in order to promote removal of deposit constituents such as copper and lead. Marks, C., *Lead Risk Minimization Program at Palisades Generating Plant*, EPRI, Palo Alto, Calif., EPRI 1016556 (2008) ("the Marks article"); Stevens, J., et al., "Steam Generator Deposit Control Program Assessment at Comanche Peak", *Chemie 2002 Proceedings: International Conference Water Chemistry in Nuclear Reactors Systems Operation Optimization and New Developments Volume 3.* Avignon, France, Apr. 22-26, 2002 ("Stevens"); Fellers, B., and J. Wooten, "Alternative Amines Improve Plant Performance at Comanche Peak Steam Electric Station", Presented at *EPRI Nuclear Plant Performance Improvement Seminar*, Charleston, S.C., Aug. 3-4, 1994 ("B. Fellers"). Such amines have also been added to the secondary system during power operation at concentrations ranging from several ppb to several ppm as a means of controlling the pH within a specified band. *Effects of Different pH Control Agents on Pressurized Water Reactor Plant Systems and Components*, EPRI, Palo Alto, Calif.: 2007. 1019042.

Rootham's U.S. Pat. No. 5,764,717 ("Rootham I") and Rootham et al.'s U.S. Pat. No. 5,841,826 ("Rootham II") disclose the use of an aqueous cleaning solution comprising a cleaning agent from at least one of the group consisting of a carrier agent and an intercalation agent, or a combination thereof, wherein said carrier agent is selected from the group consisting of dimethylamine, ethylamine, 1,2-diaminomethane, diaminopropane, ethanolamine, 2-methyl-2-amino-1-propanol, 5-aminopentanol, and methoxypropylamine, where the cleaning agent is provided in a concentration of less than 0.1 wt % of said solution. The method further comprises the use of pressurized pulses within said cleaning solution to dislodge and fluidize sludge and deposits accumulated in a heat exchange vessel.

Rootham et al.'s U.S. Pat. No. 6,740,168 ("Rootham III") discloses a method of conditioning and removing scale and deposits within a heat exchange system, said scale conditioning agent comprising a chelant (such as EDTA, HEDTA, lauryl substituted EDTA and/or an organic acid such as oxalic acid, citric acid, maleic acid or mixtures thereof), a reducing agent (such as ascorbic acid, isomers of ascorbic acid, citric acid, hydrazine, catalyzed hydrazine, or carbohydrazide), a pH control agent, in particular a nitrogen containing aliphatic compound having fewer than 10 carbons such as triethanolamine, dimethylamine, ethylamine, 1,2-diaminoethane, diaminopropane, ethanolamine, diethanolamine, 2-methyl-2-amino-1-propanol, 5-aminopentanol, or methoxypropylamine, and a non-ionic surfactant such as Triton X-100. The treatment concentration of this scale conditioning agent in the aqueous cleaning solution is less than 1 wt %, the treatment temperature is less than 100° C., and the treatment pH is from 3.5 to 9.

BRIEF SUMMARY

The present invention provides a method for conditioning and removing solid deposits from a surface of at least one component of a steam generating system wherein one or more quaternary ammonium hydroxides, with $pK_a$ values higher than about 13.5, is used as an active solute, alone or in combination with one or more additives. Such other additives may include chelating agents, reducing or oxidizing agents, pH adjustment agents, surfactants, corrosion inhibitors, complexing agents, dispersants and combinations thereof. The method provided by the current invention is applied preferably when the steam generating system is "offline", i.e., not operating in power production mode including, for example, startup or shutdown operations.

In general, a major factor determining the effectiveness of aqueous solutions used for control and removal of deposits in steam generating systems is the base strength of the active solute or solutes. In regions of the steam generating system where the deposits are rich in aluminum and silicon compounds, such as the lower regions of steam generators in nuclear power plants, high pH is required in order to remove accumulations of such oxides during cleaning operations. Accordingly, it is highly desirable to use the strongest possible bases as active solutes in cleaning solutions. However, the introduction of non-volatile inorganic bases, such as NaOH, KOH, and $Ca(OH)_2$ is undesirable since such introduction would leave behind non-volatile ions ($Na^+$, $K^+$, $Ca^{2+}$) that would result in significant acceleration of corrosive processes affecting the structural integrity of the steam generating system if concentrated in crevices present in the steam generating system.

Quaternary ammonium hydroxides are the strongest known volatile bases. Tetramethylammonium hydroxide (TMAH), for instance, is a base as strong as the non-volatile inorganic alkalis, and in aqueous solution it undergoes virtually complete dissociation. Because many oxides, in particular silica and alumina, are soluble in alkaline media, such hydroxides have been used in cleaning formulations, especially in applications where the volatility of the cleaning agent and/or the ability to avoid use of corrosive acids are advantageous. Thus, in the microelectronics industry, TMAH solutions have been shown to be highly effective in removing particles as well as metallic impurity contamination from the surfaces of silicon wafers following chemical mechanical polishing (CMP) of polysilicon films. See U.S. Pat. Nos. 5,466,389 and 5,863,344; see also Pan, T. M, et al., *Novel cleaning solutions for polysilicon film post chemical mechanical polishing*, IEEE Electron Device Letters 21, 338-340 (2000) and Pan, T. M. et al., *One-step cleaning solution to replace the conventional RCA two-step cleaning recipe for pregate oxide cleaning*, J. Electrochemical Soc. 148, G315-G320 (2001) ("the Pan references"). In the disclosed cleaning procedures, TMAH is used to dissolve both wet and dry layers of silicon oxide from silicon-based electronic components. Thong, J. T. L. et al., *TMAH etching of silicon and the interaction of etching parameters*, Sensors and Actuators, 63, 243-249 (1997).

The literature contains numerous additional examples of the use of TMAH for cleaning metallic substrates, especially in the microelectronics industry. Aqueous stripping compositions containing TMAH have been used for cleaning organic residues from aluminized inorganic substrates as disclosed in U.S. Pat. No. 5,563,119. TMAH solutions have been used in photoresist stripping from photolithographically-etched copper tape parts as disclosed in U.S. Pat. No. 4,714,517. More recently, TMAH solutions have been used in cleaning electronic components. Interconnects used in semiconductor fabrications were made of aluminum in the past, but have since been largely replaced by copper. Despite several advantages of copper compared to aluminum (specifically greater electrical conductivity, which allows fabrication of smaller, faster processors), copper is more easily damaged by post-CMP solutions than aluminum.

TMAH solutions have been found to combine effective cleaning of processing residues from copper interconnects with minimal damage to the interconnects themselves as disclosed in U.S. Pat. No. 6,492,308 ("the '308 patent"). Copper oxide formed on the surface of copper wiring and semiconductor devices having copper wires can be removed using TMAH solutions as disclosed in JP Pat. Pub. 2003155586. Metal-containing microelectronic substrates, where the components, such as metallic interconnects, are predominantly copper or copper alloy, and microelectronic surfaces composed of materials such as Al, W, TiN, Ta, TiW (as copper diffusion barrier metals), as well as silica, can also be cleaned using TMAH solutions as disclosed in U.S. Pat. No. 7,365,045. Similarly, TMAH solutions have been used to clean microelectronic substrates consisting of Al or Al/Cu alloys as disclosed in U.S. Pat. No. 7,419,945.

Examples of the use of TMAH in cleaning solutions in non-electronic applications and in the cleaning of steel surfaces have shown TMAH-containing cleaning solutions to be highly effective in removing screening paste residue from metal masks, such as Cu, Cu/Ni, Cu/Ni/Cu, Mo, and stainless steel as disclosed in U.S. Pat. No. 6,277,799 ("the '799 patent"). Solutions containing TMAH have been developed for cleaning Wenhelt electrodes for electron guns as disclosed in Japanese Pat. No. 04087146 ("the JP '146 patent"). TMAH is one of a group of bases that can be used for non-corrosive cleaning of airfoil or turbine engine parts such as blades, buckets, nozzles, combustion chamber liners, and vanes in an autoclave at a temperature of 150-250° C. Such cleaning applications have been shown to achieve complete removal of the surface oxides, dirt, alkali salts, and organic impurities from the surfaces and cracks of the turbine parts without damaging the underlying bond coat, where the bond coat is a metal composition such as Pt—Al, Al, Al—Ni, Ni—Cr—Al—Y, Fe—Cr—Al—Y, Co—Cr—Al—Y, Ni—Co—Cr—Al—Y, and mixtures thereof, or a metallic substrate surface, where the substrate is a Ni—, Cr—, or Fe-based superalloy or stainless steel as disclosed in U.S. Pat. No. 5,685,917 ("the '917 patent"). TMAH solutions have been used in cleaning and passivation of the surfaces of stainless steel components used in applications such as gas flow equipment, pharmaceutical manufacturing equipment, and semiconductor processing equipment as disclosed in U.S. Pat. No. 5,858,118 ("the '118 patent"). TMAH-based cleaning solutions based have been used at room temperature to remove impurities on stainless steel after polishing, causing no corrosion of the surface as disclosed in Korean Pat. No. 2008027610 ("the KR '610 patent").

TMAH is usually not the only component of cleaning solutions. For instance, as disclosed in the Pan references, conventional post-CMP cleaning solution formulations for removing particulate and metallic contamination contain 2.38 wt % TMAH, 29 wt % ammonia, 100 ppm EDTA, and water, with a resulting pH of 12.75. Similarly, silica-based, copper-containing surfaces were cleaned using a combined solution of 0.45% monethanolamine, 0.25 wt % TMAH, and 0.175 wt % ascorbic acid in water, as disclosed in the '308 patent. Ascorbic acid is a strong reducing agent, as well as a complexant. Cleaning solutions for removal of screening paste residues from metal screening masks (e.g., stainless steel or nickel alloy masks) include, in addition to a quaternary ammonium hydroxide (TMAH or 2-hydroxyethyl-trimethylammonium hydroxide), at least one water-soluble salt of a hydroxy carboxylic acid, such as lactic acid, water, and a surface active agent (0.02-0.3 wt % of a non-ionic, ionic, or amphoteric surfactant). An example of such a cleaning solution consists of 1.7-1.8 wt % of active ingredient having a pH of between 12.1 to about 12.3 as disclosed in the '799 patent.

Cleaning solutions for removing oil from articles of magnesium or magnesium alloys have been made of mixtures of TMAH and alkali tartarate salts as disclosed in U.S. Pat. No. 2,346,562. Mixed solutions of TMAH and hydrogen peroxide have been developed for cleaning electrodes for electron guns as disclosed in JP '146 patent. Cleaning solutions proposed for use with airfoils or turbine engine parts contain an organic solvent such as methanol, a base such as TMAH, and water were disclosed in the '917 patent. A cleaning composition recommended for stainless steel surfaces in processing equipment included 20-35 wt % TMAH, 2-8 wt % of a chelant such as EDTA, and 57-78 wt % water was disclosed in the '118 patent. Non-corrosive cleaning solutions for polished stainless steel surfaces contain TMAH, an organic solvent, and water were disclosed in the KR '610 patent.

Despite favorable experience with quaternary ammonium hydroxides in other industries and applications, prior art methods for removing or conditioning deposits formed in steam generating systems, such as deposits containing anhydrous or hydrated oxides or hydroxides of silicon or aluminum and the complex sludge compositions found in storage tanks which may include, for example, a wide range of mixtures of metallic and semimetallic compounds including, for example, anhydrous or hydrated oxides and/or hydroxides singly or in combination with nitrates, sulfates, carbonates and/or phosphates, have not made use of quaternary ammonium hydroxides as an active solute, alone or in combination with one or more additives. According to the present embodiments, cleaning solutions containing a quaternary ammonium hydroxide such as TMAH, alone or in combination with additives including, for example, organic acids, complexants or chelating agents such as EDTA, citric acid, oxalic acid, maleic acid and the like, pH adjustment or stabilizing agents such as boric acid or ammonium bicarbonate, corrosion inhibitors, surfactants, reductants such as hydrazine or ascorbic acid, oxidants such as hydrogen peroxide, dispersants, etc. depending on the nature of the metallic surfaces and the contaminant(s) to be removed promote effective removal of deposit contaminants in steam generating systems. These cleaning solutions can provide improved cleaning while maintaining or even reducing damage to metallic surfaces within the steam generating system to which the solutions are being applied.

Amines are generally defined in common textbooks as nitrogen atoms with one lone pair and can be viewed as substituted ammonia molecules, with the general formula $R_xNH_{(3-x)}$. This definition of an amine is generally accepted by those skilled in the art as encompassing primary, secondary, and tertiary amines. The basic structure of a tertiary amine is shown in the structural formula (1) below. The lone pair of electrons shown in this FIGURE is a primary factor that determines the chemical behavior of amines.

(1)

In contrast, quaternary ammonium hydroxides lack the lone pair of electrons found in amines and are, instead, characterized by an ammoniacal nitrogen atom that is bonded to four carbon atoms by single bonds. Because quaternary ammonium hydroxides do not contain a lone pair of electrons, their chemical behavior differs significantly from that of amines. Quaternary ammonium hydroxides are not nucleophilic nor do they participate in the hydrolysis of water. The general structure of a quaternary ammonium hydroxide is shown in structural formula (2) below.

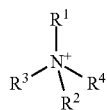

(2)

Quaternary ammonium hydroxides are, in general, very strong bases, with $pK_a$ values of at least about 13.5 with the preferred quaternary ammonium hydroxide being TMAH. When utilized under appropriate conditions as detailed below, the disclosed quaternary ammonium hydroxide cleaning solutions exhibit low corrosion rates towards typical construction alloys of steam generators, such as carbon steel, low alloy steel, and nickel alloys (for example, Inconel 600). Indeed, as demonstrated by the Examples provided below, the disclosed methods achieved corrosion results similar to those exhibited by conventional cleaning agents such as the dilute cleaning method disclosed in Rootham III and dimethylamine soaks disclosed in Fellers I and II while improving operator safety.

Because TMAH is a strong base, contact with its aqueous solutions should be avoided to prevent harm to the skin, eyes, or mucous membranes. Apart from these concerns common to caustic material handling, however, TMAH does not have specific indications of high toxicity, particularly when compared to other amines used in steam generation applications, such as dimethylamine (DMA), or compared to strong inorganic bases such as sodium hydroxide. TMAH is thermally stable in aqueous solutions up to about 130-135° C. The main products of thermal decomposition of TMAH around this temperature are trimethylamine and ammonia. Methanol is formed as a minor by-product and its concentration may become significant at higher temperatures. Thus, thermal decomposition is generally not a concern in cleaning operations according to the present invention, where the preferred operating temperature does not tend to exceed about 100° C. Even if small amounts of the abovementioned decomposition products are formed, they would not be expected to leave behind undesirable residues or to cause significant safety concerns.

Other quaternary ammonium hydroxides which may be used in practicing the present invention include other tetraalkylammonium hydroxides where the four alkyl groups are all identical, such as tetrabutylammonium hydroxide, tetrapropylammonium hydroxide, tetraethylammonium hydroxide, other tetraalkylammonium hydroxides where the four alkyl groups are not all identical, such as didecyldimethylammonium hydroxide, or choline hydroxide, or mixtures of more than one quaternary ammonium hydroxide.

Additional solutes of the cleaning solutions according to the present invention may include chelating agents such as EDTA, HEDTA, lauryl substituted EDTA and/or organic acid compositions including, for example, oxalic acid, citric acid, maleic acid or mixtures thereof, reducing agents such as hydrazine or ascorbic acid, oxidizing agents such as hydrogen peroxide, corrosion inhibitors such as CCI-801 [an alkylthiopolyimino-amide], pH adjustment or stabilizing agents such as boric acid or ammonium bicarbonate, surfactants such as Triton X-100 [CAS Reg. No.: 9002-93-1 and CA Index Name: Poly(oxy-1,2-ethanediyl), α[4-(1,1,3,3-tetramethylbutyl)phenyl]-ω-hydroxy, or other additives including, for example, complexing agents, dispersants and combinations thereof.

According to the present invention, the concentration of quaternary ammonium hydroxide in the cleaning solution is between 0.0001 wt % and 15 wt %. High concentrations of quaternary amines may be used in cleaning operations involving prolonged shutdown and provision of equipment capable of handling large amounts of chemicals. Preferably, the concentration of quaternary ammonium hydroxide is between 0.0001 wt % and 5 wt %, and it is used in cleaning operations intended to utilize relatively dilute cleaning solutions in order to reduce the outage time and the need to handle and dispose of large amounts of chemicals.

The operating temperature for the cleaning process should be set below the thermal decomposition temperature of the quaternary ammonium hydroxide(s) used in the cleaning solution (about 135° C. for TMAH) to reduce or avoid thermal decomposition. Because such temperatures tend to be below the normal operating parameters for conventional steam generators, it is anticipated that the cleaning process will be employed with the steam generator in a shutdown mode and possibly drained, either partially or completely, of the usual heat transfer fluid. To accelerate the scale conditioning and removal, the temperature of the cleaning solution is typically elevated relative to ambient temperature, preferably being maintained between about 60° C. and 95° C., most preferably between about 80° C. and 90° C. The cleaning may be facilitated by flow-induced mixing, inert gas sparging, pressure pulsing, or another means of promoting dislodging and fluidization of scale, deposits, and sludge, or the combination of two or more of these methods during circulation of the treatment solution.

The room-temperature pH of the treatment solution is generally maintained at a value above 7, and preferably above 9. pH values above 9 are generally preferred to in order to promote enhanced removal of oxides and hydrated oxides of aluminum and silicon. However, it is recognized pH control agents such DMA, ammonia and the like are commonly used to control the pH of cleaning solutions containing organic acids, complexants and/or chelating agents to lower pH values. Thus, it will be appreciated by those skilled in the art that, even at lower pH values such as at pH 5, quaternary ammonium hydroxides may also be used as a pH control agents in order to enhance the removal of targeted deposit species relative to prior art cleaning solutions.

Because the use of very strong bases in cleaning solutions is more advantageous when the scale, deposit, or sludge contains high concentrations of anhydrous or hydrated oxides of aluminum, silicon, or both, which are commonly found on or near boiling surfaces, cleaning solutions which contain quaternary ammonium hydroxides and target the removal of these deposit species are most useful when applied to steam generators, rather than other parts of the secondary circuit of steam generating systems. Within the steam generators, the area where such cleaning operations are most useful is at or near tube to tubesheet intersections in the lower bundle region of a vertically-oriented steam generator. This whole area of the steam generator or a part thereof is contacted with the cleaning solution according to the present invention.

In order to reduce the amount of chemicals required, the amounts of the target compounds, for example, anhydrous and hydrated aluminum and silicon oxides deposited within the steam generator are estimated, and the amount of quaternary ammonium hydroxide added may be adjusted to provide a molar excess of between about 1 and 100, preferably between about 2 and 20, over the combined amount of the targeted compounds. Addition of chelating agents such as EDTA or of reducing agents such as hydrazine or both can be useful if the deposits to be removed contain, in addition to anhydrous or hydrated oxides of aluminum and silicon, anhydrous or hydrated oxides of iron, such as magnetite. As noted above, nuclear waste deposits or sludge can contain a complex mixture of compounds including, for example, a wide range of mixtures of metallic and semimetallic compounds including, for example, anhydrous or hydrated oxides and/or hydroxides singly or in combination with nitrates, sulfates, carbonates and/or phosphates. Representative species obtained from analysis of nuclear waste sludge has included, for example, $Al(OH)_3$; Gibbsite; $(NaAlSiO_4)_6 \cdot (NaNO_3)_{1.6} \cdot 2H_2O$, $NO_3$-Cancrinite; $AlO(OH)$, Boehmite; $NaAl(CO_3)(OH)_2$, Dawsonite; $Fe_2O_3$, Hemtatite; $Ca_5OH(PO_4)_3$, Hydroxylapatite; $Na_2U_2O_7$, Clarkeite; $ZrO_2$, Baddeleyite; $Bi_2O_3$, Bismite; $SiO_2$, Quartz-Silica; $Ni(OH)_2$, Theophrasite; $MnO_2$, Pyrolusite; $CaF_2$, Fluorite; $LaPO_4 \cdot 2H_2O$; $Ag_2CO_3$ and $PuO_2$. As will be appreciated by those skilled in the art, the composition of the cleaning solution and the relative concentrations of the quaternary ammonium hydroxide and other included species can be adapted to address the particular composition and quantity of the targeted compounds found in the nuclear waste sludge or other tank sludge that is being conditioned and removed. Indeed, depending on the nature of the deposits, the composition of the cleaning solution can be modified over the course of the treatment period to reflect changing conditions within the vessel or component being cleaned and/or changes within the composition and/or structure of the deposits over the course of the treatment period.

In order to increase the fraction of the active solutes in the cleaning solution, in particular the quaternary ammonium hydroxide, available for reacting with targeted deposit contaminants present in the steam generator, the introduction of the cleaning solution according to the present invention is preferably conducted following introduction and subsequent draining of a cleaning solution having at least one chelant such as EDTA, HEDTA, lauryl substituted EDTA and/or an organic acid including, for example, oxalic acid, citric acid, maleic acid or mixtures thereof as its main component to remove a majority of the magnetite portion of the deposits, especially those deposits located in the lower part of the steam generator. A reducing agent such as hydrazine or ascorbic acid and a pH control agent may also be added to the chelant solution to optimize the removal of iron species. As noted above, deposits present in steam generating systems often contain primarily iron oxides as a result of typical materials of construction used in these systems. Thus, removal of iron oxides in advance of introduction of the cleaning solution according to the present invention may improve access to targeted deposit contaminants.

In those instances in which the total deposit load of the targeted compounds is relatively high, introducing a cleaning solution having a sufficient quantity of the quaternary ammonium hydroxide to achieve the desired molar ratio may be impractical. In such instances, the desired quantity of the quaternary ammonium hydroxide may be introduced using a series of cleaning solutions, thereby keeping the treatment concentration utilized in any one application of the cleaning solution lower while still achieving the overall molar ratio target relative to the target compounds. For example, the sequential application of four cleaning solutions having a treatment concentration sufficient to obtain a molar ratio of 1:2, a sub-molar ratio, will provide the equivalent exposure as a single application of a cleaning solution having a treatment concentration sufficient to obtain a molar ratio of 2:1. Although this example utilized cleaning solutions of equal concentration, the method is not so limited and may be practiced with cleaning solutions in which treatment concentration increases, decreases or exhibits a more complex profile of increasing, decreasing and/or constant concentrations over the course of the treatment period. As will be appreciated, the treatment concentration of the cleaning solution may also be altered during the treatment period through the addition of quaternary ammonium hydroxide or dilution of the initial concentration through the addition of water.

The cleaning method of the present invention can be used for conditioning and removal of scale, deposits, or sludge from steam generating systems in nuclear and non-nuclear facilities.

It is an object of the present invention to provide a more effective method for softening and partial dissolution of scale, formation of pores, or detachment of scale, deposits, or sludge from surfaces of components within a steam generating system, or a combination thereof, especially when said scale, deposits or sludge contain as target species mixtures of metallic and semimetallic compounds including, for example, anhydrous or hydrated oxides and/or hydroxides singly or in combination with nitrates, sulfates, carbonates and/or phosphates. It is another object of the present invention to provide a more cost-effective method of cleaning steam generators using aqueous cleaning solutions with relatively low concentrations of cleaning agents in order to reduce the outage time and the need to handle and dispose of large amounts of chemicals.

It is another object of the present invention to provide a more effective method for conditioning, partial dissolution, or removal of scale, deposits, or sludge from a vessel or tank containing nuclear contaminants, especially when the scale, deposits or sludge contain mixtures of metallic and semimetallic compounds including, for example, anhydrous or hydrated oxides and/or hydroxides singly or in combination with nitrates, sulfates, carbonates and/or phosphates.

DESCRIPTION OF EXAMPLE EMBODIMENTS

The preferred embodiment of the invention is particularly useful in conditioning and removing deposits from the lower region of the secondary side of steam generators. This embodiment comprises several steps, beginning with taking the heat exchange system out of service and removing at least a portion of the heat transfer liquid from the steam generator. The steam generator is then subjected to the introduction, soaking, and draining of cleaning solutions. Circulation or gas sparging may be performed to promote mixing during chemical soaking. The first cleaning solution or solutions contain, as their major cleaning agent, a chelant such as EDTA, along with a reducing agent such as hydrazine and a pH control agent to optimize the removal of iron species. This is followed by the introduction of an aqueous cleaning solution containing a scale conditioning agent into the heat exchange system. The scale conditioning solution contains a quaternary ammonium hydroxide, such as TMAH, at a concentration between 0.0001 wt % and 15 wt %, and a chelant such as EDTA. Other additives, such as hydrazine or ascorbic acid, may also be used. The molar amount of quaternary ammonium hydroxide, such as TMAH, in the scale conditioning solution is between 2 and 20 times the estimated combined amount of anhydrous and hydrated aluminum and silicon oxides and hydroxides. The circulation of the scale conditioning solution is carried out at a temperature of between about 60° C. and 95° C., most preferably between about 80° C. and 90° C.

In a number of the example embodiments discussed below, the performance of cleaning solutions containing TMAH is compared to prior art cleaning solutions containing DMA such as disclosed by Fellers. As discussed above, quaternary ammonium hydroxides are chemically and functionally distinct from amines such as those used in prior cleaning solutions. Nonetheless, comparison to the performance of these amines provides a reasonable metric for assessing the effectiveness of cleaning solutions of the current invention.

Comparable concentrations of quaternary ammonium hydroxide, DMA and other amines are generally considered in the examples discussed below. In practice however, the concentration of prior art amines is generally limited to much lower concentrations than those discussed in the examples below due to concerns regarding flammability and other potential hazards. For example, Fellers discloses cleaning solutions containing DMA concentrations in the range of 10 ppb (0.000001 wt %) to 50 ppm (0.005 wt %). In contrast, the TMAH used in several example embodiments of the current invention can be used safely at concentrations of 15 wt % or higher. Thus, it is noted that while comparisons are generally made at equivalent concentrations in the example embodiments below, improvements in removal of targeted deposit species achieved through the use of quaternary ammonium hydroxides would likely be several orders of magnitude greater than reported below due to the fact that use of prior art amines such as DMA is generally limited to much lower concentration ranges.

EXAMPLES

Example 1

An example embodiment of the present invention was evaluated in laboratory testing using mixtures of 0.06 g of boehmite and 0.06 g of silica sand (B+S) or of 0.06 g of boehmite, 0.06 g of silica sand, and 0.68 g of magnetite (B+S+M). These mixtures were heated at 80° C. for 1 day, with 40 mL volumes of a solution of 381 ppm (0.0381%) of TMAH in de-ionized water, adjusted with boric acid to a room-temperature pH of 11.0.

For comparison to prior art cleaning techniques such as DMA soaks disclosed by Fellers, similar mixtures with 40 mL volumes of a solution of 356 ppm of dimethylamine (DMA) in de-ionized water, adjusted with boric acid to a similar room-temperature pH of 11.0, were evaluated under similar conditions. DMA soaks disclosed by Fellers I and II target the removal of copper and lead as discussed in the Marks article. Nonetheless, comparison to such cleaning solutions were considered to be a reasonable metric by which to assess the effectiveness of cleaning solutions of the present invention for removing other deposit contaminants, such as anhydrous or hydrated oxides of aluminum and silicon.

At the end of 1 day, the solutions were removed for analysis of dissolved Al, Si, and Fe, and the experiment on the residual solids was continued for an additional 2-day interval using fresh volumes of the original solutions. In addition to the fractions of each oxide dissolved during the experiment, the mole ratios of metals dissolved to base (TMAH or DMA) introduced were also calculated. The results of these tests are shown in Table 1.

The results showed that boehmite was the most soluble component. The mole ratio calculations for the solutions obtained in the two stages of the experiment showed that the ratio of dissolved Al to base was 0.06-0.07 for DMA solutions and 0.24-0.29 for TMAH solutions. The second, 2-day step had comparable effectiveness to that of the first, 1-day step.

TABLE 1

| Solution | Solids | Oxide | Fraction of oxide dissolved, % | | Dissolved metal/base mole ratio | |
|---|---|---|---|---|---|---|
| | | | Day 1 | Days 2-3 | Day 1 | Days 2-3 |
| 356 ppm DMA | B + S | AlOOH | 6.369 | 5.771 | 0.067 | 0.061 |
| | | $SiO_2$ | 0.070 | 0.018 | 0.001 | 0.002 |
| 381 ppm TMAH | B + S | AlOOH | 14.703 | 12.636 | 0.293 | 0.252 |
| | | $SiO_2$ | 0.079 | 0.019 | 0.002 | 0.000 |
| 356 ppm DMA | B + S + M | AlOOH | 6.416 | 6.227 | 0.068 | 0.066 |
| | | $SiO_2$ | 0.042 | 0.015 | 0.000 | 0.000 |
| | | $Fe_3O_4$ | 0.003 | 0.011 | 0.000 | 0.001 |
| 381 ppm TMAH | B + S + M | AlOOH | 13.617 | 12.174 | 0.272 | 0.243 |
| | | $SiO_2$ | 0.070 | 0.018 | 0.001 | 0.000 |
| | | $Fe_3O_4$ | 0.007 | 0.004 | 0.001 | 0.001 |

Example 2

Other example embodiments of the present invention were evaluated in laboratory testing using mixtures of 0.02 g of boehmite and 0.02 g of silica sand (B+S), and 0.23 g of magnetite (B+S+M). These mixtures were heated at 80° C. for 1 day, with 40 mL volumes of solutions of 1500 ppm (0.15%) of TMAH in de-ionized water, without pH adjustment, adjusted with boric acid to a room-temperature pH of 11.0, or adjusted with boric acid to a room-temperature pH of 9.0.

In parallel, similar mixtures were heated under similar conditions, with 40 mL volumes of solutions of 84 ppm (0.0084%) of dimethylamine (DMA) in de-ionized water, without pH adjustment, adjusted with boric acid to a room-temperature pH of 11.0, or adjusted with boric acid to a room-temperature pH of 9.0. All the solutions were sparged with nitrogen for 15 minutes at the beginning of each experiment.

After one day (~24 hours), the solutions were removed for analysis of dissolved Al, Si, and Fe. The experiment on the residual solids was continued for an additional 2-day interval using fresh volumes of the original solutions. In addition to the fractions of each oxide dissolved during the experiment, the mole ratios of metals dissolved to base (TMAH or DMA) introduced were also calculated. (These calculations were limited to the unadjusted solutions because the effective initial amount of base in the solutions adjusted to pH 11 or pH 9 was substantially decreased due to partial neutralization during the pH adjustment.) The dissolved metal/introduced base molar ratios for the pH-adjusted solutions were therefore estimated based on pH measurements. The results of these tests are shown in Table 2.

TABLE 2

| Solution | Oxide | Fraction of oxide dissolved, % | | | Dissolved metal/base mole ratio | |
|---|---|---|---|---|---|---|
| | | Day 1 | Days 2-3 | Total | Day 1 | Day 2-3 |
| 84 ppm DMA, unadjusted pH | AlOOH | 1.131 | 0.596 | 1.728 | 0.002 | 0.000 |
| | SiO$_2$ | 0.074 | 0.038 | 0.774 | 0.003 | 0.002 |
| | Fe$_3$O$_4$ | 0.070 | 0.012 | 0.082 | 0.051 | 0.027 |
| | Total | 0.148 | 0.058 | 0.206 | 0.056 | 0.029 |
| 1500 ppm TMAH, unadjusted pH | AlOOH | 18.894 | 17.272 | 36.166 | 0.000 | 0.000 |
| | SiO$_2$ | 0.106 | 0.045 | 0.152 | 0.001 | 0.000 |
| | Fe$_3$O$_4$ | 0.015 | 0.016 | 0.031 | 0.096 | 0.087 |
| | Total | 1.420 | 1.296 | 2.716 | 0.096 | 0.088 |
| 84 ppm DMA, pH 11 | AlOOH | 1.249 | 0.628 | 1.877 | (0.189) | (0.112) |
| | SiO$_2$ | 0.069 | 0.026 | 0.095 | (0.010) | (0.005) |
| | Fe$_3$O$_4$ | 0.034 | 0.052 | 0.086 | (0.004) | (0.007) |
| | Total | 0.126 | 0.092 | 0.219 | (0.204) | (0.124) |
| 1500 ppm TMAH, pH 11 | AlOOH | 4.245 | 2.421 | 6.666 | (1.316) | (0.902) |
| | SiO$_2$ | 0.034 | 0.003 | 0.037 | (0.011) | (0.001) |
| | Fe$_3$O$_4$ | 0.005 | 0.012 | 0.017 | (0.001) | (0.004) |
| | Total | 0.321 | 0.190 | 0.511 | (1.327) | (0.906) |
| 84 ppm DMA, pH 9 | AlOOH | 0.360 | 0.117 | 0.477 | (2.729) | (0.955) |
| | SiO$_2$ | 0.039 | 0.036 | 0.075 | (0.293) | (0.292) |
| | Fe$_3$O$_4$ | 0.033 | 0.066 | 0.099 | (0.195) | (0.415) |
| | Total | 0.058 | 0.067 | 0.125 | (3.216) | (1.663) |
| 1500 ppm TMAH, pH 9 | AlOOH | 0.866 | 0.397 | 1.262 | (6.013) | (2.688) |
| | SiO$_2$ | 0.050 | 0.030 | 0.080 | (0.348) | (0.202) |
| | Fe$_3$O$_4$ | 0.032 | 0.020 | 0.052 | (0.172) | (0.107) |
| | Total | 0.095 | 0.049 | 0.144 | (6.533) | (2.997) |

The mole ratio calculations for the unadjusted solutions obtained in the two stages of the experiment showed that the ratio of dissolved metals (Al, Si and Fe) to base was 0.03-0.06 in the cases of DMA solutions and 0.09-0.10 in the case of TMAH solutions. The mole ratios for the pH adjusted solutions were also consistently higher by factors of 2-8 for solutions containing TMAH. As was observed in prior testing discussed in Example 1, TMAH solutions were very effective for dissolving boehmite, in particular. For example, cumulative dissolution of approximately 36% of available boehmite was observed in the unadjusted TMAH solution, compared to approximately 1.7% in the unadjusted DMA solution.

Example 3

Another example embodiment of the present invention was evaluated in laboratory testing using mixtures of 0.06 g of boehmite and 0.06 g of silica sand (B+S) or of 0.06 g of boehmite, 0.06 g of silica sand, and 0.68 g of magnetite (B+S+M). These mixtures were heated at 80° C. for 1 day with 40 mL volumes of a solution of 46 ppm (0.0046%) of TMAH in de-ionized water, having a room-temperature pH of 10.8.

In parallel, similar mixtures were heated under similar conditions, with 40 mL volumes of a solution of 70 ppm (0.007%) of dimethylamine (DMA) in de-ionized water, having a similar room-temperature pH of 10.8.

At the end of 1 day, the solutions were removed and analyzed for dissolved Al, Si, and Fe. The experiment on the residual solids was continued for an additional 2-day interval using fresh volumes of the original solutions. In addition to the fraction of each oxide dissolved during the experiment, the mole ratios of metals dissolved to base (TMAH or DMA) introduced were also calculated. The results are shown in Table 3.

TABLE 3

| Solution | Solids | Oxide | Fraction of oxide dissolved, % | | Dissolved metal/base mole ratio | |
|---|---|---|---|---|---|---|
| | | | Day 1 | Days 2-3 | Day 1 | Days 2-3 |
| 70 ppm DMA | B + S | AlOOH | 0.492 | 0.633 | 0.0792 | 0.102 |
| | | SiO$_2$ | 0.045 | 0.019 | 0.0072 | 0.0031 |
| 46 ppm TMAH | B + S | AlOOH | 0.330 | 0.555 | 0.1624 | 0.2737 |
| | | SiO$_2$ | 0.032 | 0.020 | 0.0159 | 0.0100 |
| 70 ppm DMA | B + S + M | AlOOH | 0.266 | 0.427 | 0.0429 | 0.0687 |
| | | SiO$_2$ | 0.002 | 0.005 | 0.0006 | 0.0016 |
| | | Fe$_3$O$_4$ | 0.001 | 0.002 | 0.0013 | 0.0033 |
| 46 ppm TMAH | B + S + M | AlOOH | 0.103 | 0.376 | 0.0507 | 0.1853 |
| | | SiO$_2$ | 0.002 | 0.009 | 0.0018 | 0.0090 |
| | | Fe$_3$O$_4$ | 0.000 | 0.003 | 0.0008 | 0.0132 |

The results showed that boehmite was the most soluble component. The mole ratio calculations for the solutions obtained in the two stages of the experiment showed that the ratio of dissolved Al to base was 0.04-0.10 in the cases of DMA solutions and 0.05-0.27 in the case of TMAH solutions.

Note that the extent of oxide dissolution observed in similar testing discussed in Example 1 and summarized in Table 1 (up to 15% dissolution of boehmite per testing interval) was higher than the extent of oxide dissolution observed in testing discussed in Example 3 and summarized in Table 3 (less than 0.7% dissolution of boehmite per testing interval). This observation is attributed not only to the higher concentration of solutions evaluated in Example 1, but also to the higher solution pH (related to the higher concentration of base present initially), as compared to Example 3. In both examples, the molar ratio calculations showed that TMAH was more effective than DMA. However, the superior performance of TMAH is more pronounced in Example 1.

Example 4

Another example embodiment of the present invention was evaluated in laboratory testing using mixtures of 0.06 g of boehmite and 0.06 g of silica sand (B+S) or of 0.06 g of boehmite, 0.06 g of silica sand, and 0.68 g of magnetite (B+S+M). These mixtures were heated at 80° C. for 1 day, with 40 mL volumes of a combined solution of 50.8 g/L (5.08%) of TMAH and 10 $g \cdot L^{-1}$ (1%) of ethylenediamine-tetra-acetic acid (EDTA) in de-ionized water.

In parallel, similar mixtures were heated under similar conditions, with 40 mL volumes of a combined solution of 17.8 $g \cdot L^{-1}$ (1.78%) of dimethylamine (DMA) and 10 $g \cdot L^{-1}$ (1%) of ethylenediaminetetra-acetic acid (EDTA) in de-ionized water.

At the end of 1 day, the solutions were removed for analysis of dissolved Al, Si, and Fe. In addition to fractions of each oxide dissolved during the experiment, the mole ratios of the amount of metals dissolved to base (TMAH or DMA) introduced were also calculated. The results are shown in Table 4.

TABLE 4

| Solution | Solids | Oxide | Fraction of oxide dissolved,% | Dissolved metal/base mole ratio |
|---|---|---|---|---|
| 17.8 $g \cdot L^{-1}$ DMA + 10 $g \cdot L^{-1}$ EDTA | B + S | AlOOH | 15.132 | 0.024 |
| | | SiO$_2$ | 0.013 | 0.000 |
| | | Total | 7.573 | 0.024 |
| 50.8 $g \cdot L^{-1}$ TMAH + 10 $g \cdot L^{-1}$ EDTA | B + S | AlOOH | 85.951 | 0.154 |
| | | SiO$_2$ | 0.379 | 0.001 |
| | | Total | 43.165 | 0.155 |
| 17.8 $g \cdot L^{-1}$ DMA + 10 $g \cdot L^{-1}$ EDTA | B + S + M | AlOOH | 21.085 | 0.033 |
| | | SiO$_2$ | 0.002 | 0.000 |
| | | Fe$_3$O$_4$ | 1.288 | 0.002 |
| | | Total | 2.677 | 0.035 |
| 50.8 $g \cdot L^{-1}$ TMAH + 10 $g \cdot L^{-1}$ EDTA | B + S + M | AlOOH | 84.266 | 0.151 |
| | | SiO$_2$ | 0.089 | 0.000 |
| | | Fe$_3$O$_4$ | 0.097 | 0.000 |
| | | Total | 6.409 | 0.152 |

The results showed that boehmite was the most soluble component. The mole ratio calculations showed that the ratio of total dissolved metal (predominantly dissolved Al) to introduced base was 0.02-0.04 in the cases of DMA solutions and 0.15-0.16 in the case of TMAH solutions. As in the cases of the low-concentration cleaning solutions discussed in Examples 1 through 3, the mole ratio calculations showed that TMAH was more effective than DMA by a factor of 4-7. In general, the superior performance of TMAH is more pronounced in the more concentrated solutions of Example 4.

Example 5

Another example embodiment of the present invention was evaluated in laboratory testing using samples of silica sand (S), samples of boehmite (B) or mixtures of sand and boehmite (B+S). These samples and mixtures were heated at 80° C. for 1 day, with 40 mL volumes of a solution of 2.5% TMAH. In parallel, similar mixtures were heated under similar conditions, with 40 mL volumes of a solution of 10% of dimethylamine (DMA) in de-ionized water. At the end of 1 day, the solutions were removed for analysis of dissolved Si. The results are shown in Table 5.

TABLE 5

| | Dissolved Si concentration (sand and sand mixtures) or Al concentration (boehmite), $mg \cdot L^{-1}$ | |
|---|---|---|
| Solids | 10% DMA | 2.5% TMAH |
| 0.03 g sand | 40.75 | 79.56 |
| 0.03 g boehmite | 2.45 | 32.44 |
| 0.03 g sand + 0.03 g boehmite | 4.49 | 44.12 |
| 0.03 g sand + 0.09 g boehmite | 2.96 | 46.87 |

The results showed that the concentrations of dissolved Si were higher by a factor of 2-16 in the 2.5% TMAH solution than in the 10% DMA solution despite the fact that the mass concentration of TMAH was lower by a factor of 4 and the molar concentration of TMAH was lower by a factor of 8. The difference in Si dissolution by the two solutions was particularly large when boehmite was also present, indicating that residual boehmite suppressed Si dissolution. The extent to which Si dissolution was suppressed by the presence of boehmite was significantly higher in testing of the DMA solution than in testing conducted with the TMAH solution. Thus, the superior performance of TMAH was more pronounced when boehmite was present.

Similar testing of the solution cited in Table 5 was also conducted with a sample of 0.03 g boehmite alone and showed that dissolution of Al was a factor of 13 higher despite the fact that the mass concentration of TMAH was lower by a factor of 4 and the molar concentration of TMAH was lower by a factor of 8

Example 6

Other example embodiments of the present invention were evaluated in laboratory testing using actual PWR SG deposits (referred to as "collar samples"), consisting of solids removed from the deposits surrounding the tubes in the secondary circuit of a steam generator at a U.S. PWR nuclear plant. Specifically, 0.12 g samples of collars or mixtures of 0.12 g of collars and 0.68 g of magnetite were heated at 80° C. for 1 day, with 40 mL volumes of solutions of 5% of TMAH alone or 5% TMAH+1% EDTA in de-ionized water. In parallel, similar samples were heated under similar conditions with 40 mL volumes of a solution of 2% of DMA alone or 2% TMAH+1% EDTA in de-ionized water. At the end of 1 day, the solutions were removed for analyses of dissolved Al, Si, and Fe. The experiment on the residual solids was continued for an additional 2-day interval using fresh volumes of the original solutions. The cumulative percentage of solids (as Al, Si or Fe) dissolved during the combined effect of the two test periods are shown in Table 6.

TABLE 6

| | Dissolved fraction, %, relative to the total weight of the sample | | | | | | | |
|---|---|---|---|---|---|---|---|---|
| | 0.12 g of crushed collars | | | | 0.12 g of crushed collars + 0.68 g of magnetite | | | |
| Solution | Al | Si | Fe | Total | Al | Si | Fe | Total |
| 2% DMA | 5.46 | 0.31 | 0.01 | 5.78 | 0.97 | 0.02 | 0.01 | 1.00 |
| 2% DMA + 1% EDTA | 7.95 | 1.28 | 2.92 | 12.15 | 1.13 | 0.07 | 0.37 | 1.57 |
| 5% TMAH | 9.34 | 0.91 | 0.05 | 10.30 | 1.68 | 0.16 | 0.00 | 1.84 |
| 5% TMAH + 1% EDTA | 14.24 | 2.36 | 0.00 | 16.58 | 2.30 | 0.31 | 0.01 | 2.62 |

Consistent with testing using synthetic mixtures discussed in Examples 1 through 5, the results showed that boehmite was the most soluble component in actual plant deposits and the performance of solutions containing TMAH was superior to solutions containing DMA with regard to dissolution of Al and Si species. TMAH and DMA were present at comparable molar concentrations in the solutions evaluated in Example 6 and summarized in Table 6.

Example 7

Other example embodiments of the present invention were evaluated in laboratory testing using C1018 carbon steel and Inconel 600 coupons, which represent common materials of construction in steam generators. These coupons were exposed to 40 mL volumes of a combined solution of 5% of TMAH and 1% of ethylenediaminetetra-acetic acid (EDTA) in de-ionized water at 80° C. for 1 week. In parallel, similar coupons were heated under similar conditions, with 40 mL volumes of a combined solution of 2% mg/L of dimethylamine (DMA) and 1% of EDTA in de-ionized water. The dimensions of the C1018 coupons were 0.9×0.85×0.28 cm, and the dimensions of the Inconel 600 coupons were 1.25× 1.2×0.3 cm. At the end of 1 week, the solutions were removed for analysis of dissolved Fe, Mn, Ni, and Cr, which are of interest when evaluating the corrosion of C1018 and Inconel 600 coupons. The dissolved concentrations of the four metals were combined and used to determine the rate of dissolution of the coupons throughout the 1-week period. The experiment on the coupons was continued for an additional 3-week interval using fresh volumes of the original solutions, and then for a final interval of 4 weeks, again using fresh volumes of the original solutions. The results are shown in Table 7.

TABLE 7

| | | Dissolution rate, $\mu m \cdot yr^{-1}$ | | |
|---|---|---|---|---|
| Coupon | Solution | First week | Next 3 weeks | Last 4 weeks |
| C1018 | 2% DMA + 1% EDTA | 4.204 | 4.706 | 1.146 |
| C1018 | 5% TMAH + 1% EDTA | 0.860 | 0.140 | 0.089 |
| Inconel 600 | 2% DMA + 1% EDTA | 0.322 | 0.090 | 0.006 |
| Inconel 600 | 5% TMAH + 1% EDTA | 0.788 | 0.333 | 0.135 |

The results showed that the extent of corrosion using these two cleaning solutions was quite small, despite the fact that the tests were performed in the absence of corrosion inhibitors. At 80° C., the extent of corrosion of C1018 carbon steel was lower in the TMAH-based solutions than in the DMA-based solutions, although corrosion rates in both solutions were essentially negligible, approximately 5-7 orders of magnitude less than peak corrosion rates which might be expected during application of conventional concentrated steam generator chemical cleaning operations (Fellers II). For reference, lifetime corrosion allowances for carbon steel steam generator internals are typically in the range of 700-3000 µm.

Example 8

Other example embodiments of the present invention were evaluated in laboratory testing using two C1018 carbon steel coupons. These coupons were exposed to 40 mL volumes of a combined solution of 5% of TMAH and 1% of ethylenediaminetetra-acetic acid (EDTA) in de-ionized water at 80° C. for 1 week. In parallel, six similar mixtures were heated under similar conditions, with 40 mL volumes of a combined solution of 2% mg/L of dimethylamine (DMA) and 1 wt % of EDTA in de-ionized water. The dimensions of the C1018 coupons were 0.9×0.85×0.28 cm. At the end of 1 week, the solutions were removed for analyses of dissolved Fe and Mn. The dissolved concentrations of the two metals were combined and used to determine the rate of dissolution of the coupons over the 1-week period. The experiment was continued for an additional 3-week interval using fresh volumes of the original solutions. The results are shown in Table 8.

TABLE 8

| C1018 carbon | | Dissolution rate, $\mu m \cdot year^{-1}$ | |
|---|---|---|---|
| steel coupon | Solution | First week | Next 3 weeks |
| #1 | 2% DMA + 1% EDTA | 1.071 | 1.010 |
| #2 | 2% DMA + 1% EDTA | 0.973 | 0.992 |
| #3 | 2% DMA + 1% EDTA | 1.015 | 0.979 |
| #4 | 2% DMA + 1% EDTA | 0.877 | 0.949 |
| #5 | 2% DMA + 1% EDTA | 0.922 | 0.978 |
| #6 | 2% DMA + 1% EDTA | 1.091 | 1.100 |
| #7 | 5% TMAH + 1% EDTA | 0.258 | 0.0331 |
| #8 | 5% TMAH + 1% EDTA | 0.322 | 0.0525 |

The results of the first week of testing exhibited good agreement among the six samples tested in the DMA solutions, with dissolution equivalent to a corrosion rate of $0.992 \pm 0.084 \, \mu m \cdot year^{-1}$. During the second testing period, the dissolution rates of the six samples exposed to DMA solutions exhibited good agreement, with dissolution equivalent to a corrosion rate of $1.001 \pm 0.052 \, \mu m \cdot year^{-1}$. Table 8 also showed that the dissolution rates observed in the TMAH solution, $0.290 \pm 0.045 \, \mu m \cdot year^{-1}$ during the first week and $0.043 \pm 0.018 \, \mu m \cdot year^{-1}$ during the following three weeks, were much lower than the corresponding dissolution rates observed in the DMA solution, which is consistent with previous results discussed in Example 7 and summarized in Table 7. Furthermore, a sharp decrease in dissolution rate was observed during the second testing interval in the cases of the samples exposed to the TMAH solutions, but not of those exposed to the DMA solutions, indicating that the superior corrosion performance of TMAH was more pronounced with longer exposures. As noted above, the extent of corrosion observed in testing with both DMA-based and TMAH-based solutions was quite small, despite the fact that the tests were performed in the absence of corrosion inhibitors.

Example 9

In order to determine the effect of possible thermal degradation of TMAH on its corrosivity towards steel, C1018 carbon steel coupons were tested in three solutions of 5 wt % TMAH+1 wt % EDTA. One of these solutions was not pre-exposed to elevated temperatures. The second solution was exposed to a temperature of 130±10° C. for two days before being used in the test. During pre-heating period, the 20-mL Parr bomb in which the solution was heated was almost full, leaving very little vapor space above the solution. The third solution was similarly pre-heated at 130±10° C. for two days, but the Parr bomb was only half-full, holding 10 mL of solution and 10 mL of air. The three TMAH solutions were later used in testing of 1018 carbon steel coupons in 40 mL of testing solution for 1 week. The dimensions of the C1018 coupons were 0.9×0.85×0.28 cm.

At the end of 1 week, the solutions were removed for analyses of dissolved Fe and Mn. The dissolved concentrations of the two metals were combined and used to determine the rate of dissolution of the coupons throughout the 1-week period. The results of the testing with the three TMAH solutions are shown in Table 9.

TABLE 9

| Solution | Dissolved concentration, $mg \cdot L^{-1}$ | Dissolved thickness, $\mu m$ | Dissolution rate, $\mu m \cdot yr^{-1}$ |
|---|---|---|---|
| 5% TMAH + 1% EDTA, not pre-heated | 0.258 | 0.00166 | 0.0868 |
| 5% TMAH + 1% EDTA, pre-heated at 130° C., no vapor space | 1.166 | 0.00590 | 0.3079 |
| 5% TMAH + 1% EDTA, pre-heated at 130° C., air cover | 0.223 | 0.00113 | 0.0589 |

The results in Table 9 showed that pre-heating of the TMAH solution at elevated temperatures in the presence of a considerable volume of air had little effect on the corrosivity of the TMAH solution towards C1018 steel at 80° C. On the other hand, pre-heating in the presence of a very small amount of air caused an increase of corrosivity, possibly due to the formation of different thermal decomposition products than those formed under aerated conditions. Pre-heating in the absence of air also appeared to cause a slight increase in the pH of the solution, from approximately 13.0 to approximately 13.4. The observed corrosion rates of carbon steel summarized in Table 9 are very low despite the fact that solutions with relatively high concentrations of TMAH+EDTA were used in the absence of corrosion inhibitors.

Example 10

Other example embodiments of the present invention were evaluated in laboratory testing using C1018 carbon steel and Inconel 600 coupons. Specifically, an original C1018 carbon steel coupon, a pre-oxidized C1018 carbon steel coupon, an original Inconel 600 pipe section, and a pre-oxidized Inconel 600 pipe section were characterized by means of optical microscopy and scanning electron microscopy (SEM) and then heated for 48 hours at 80° C. with 40 mL volumes of a solution of a solution of 1.5 g/L (0.15%) TMAH in de-ionized water or a solution of 0.6 g/L (0.06%) of dimethylamine (DMA) in de-ionized water. A third pre-oxidized Inconel 600 pipe section was tested under the same conditions in a solution of 5% TMAH+1% EDTA in de-ionized water.

At the end of the tests, the samples were rinsed with water, dried, and characterized again by means of optical microscopy and scanning electron microscopy (SEM). The spent solutions were analyzed by means of ICP-AES to determine the concentrations of dissolved Fe, Mn, Ni, and Cr. These combined concentrations were used to calculate the equivalent thickness loss and corrosion rate based on dissolved metals concentrations. The results of chemical analysis of the spent solutions are shown in Table 10.

TABLE 10

| | | Thickness loss, $\mu m$ | | Corrosion rate, $\mu m \cdot yr^{-1}$ | |
|---|---|---|---|---|---|
| Material | Solution | Based on weight change | Based on solution analysis | Based on weight change | Based on solution analysis |
| Original carbon steel | 0.6 g · L$^{-1}$ DMA | −0.0190 | 0.0082 | −3.5 | 1.5 |
| Oxidized carbon steel | 0.6 g · L$^{-1}$ DMA | 0.0288 | 0.0115 | 5.3 | 2.1 |
| Original Inconel 600 | 0.6 g · L$^{-1}$ DMA | 0.0402 | 0.0043 | 7.3 | 0.8 |
| Oxidized Inconel 600 | 0.6 g · L$^{-1}$ DMA | 0.0489 | 0.0078 | 8.9 | 1.4 |
| Original carbon steel | 1.5 g · L$^{-1}$ TMAH | 0.0190 | 0.0068 | 3.5 | 1.2 |
| Oxidized carbon steel | 1.5 g · L$^{-1}$ TMAH | 0.2297 | 0.0103 | 41.9 | 1.9 |
| Original Inconel 600 | 1.5 g · L$^{-1}$ TMAH | 0.0334 | 0.0062 | 6.1 | 1.1 |
| Oxidized Inconel 600 | 1.5 g · L$^{-1}$ TMAH | 0.0821 | 0.0209 | 15.0 | 3.8 |
| Oxidized Inconel 600 | 50 g · L$^{-1}$ TMAH + 10 g · L$^{-1}$ EDTA | 0.1369 | 0.0825 | 25.0 | 15.1 |

These results showed that the extent of general corrosion during the treatment in all cases was negligible. The extent of corrosion in dilute TMAH solutions was similar to the extent of corrosion in dilute DMA solutions, and was only observed to be larger in the case of pre-oxidized Inconel 600 specimens. Measurements of the extent of corrosion in a solution with a much higher concentration of TMAH were carried out only in the case of pre-oxidized Inconel 600. The extent of dissolution in this solution was higher than the corresponding extent of dissolution in the dilute solutions, but still resulted in less than 0.1 μm of corrosion during the test period of 48 hours.

The equivalent thickness losses were calculated assuming uniform penetration into exposed metallic surfaces of original specimens, with a density of 7.87 g·cm$^{-3}$ in the case of carbon steel and 8.47 g·cm$^{-3}$ in the case of Inconel 600, and assuming uniform penetration into the exposed oxide surfaces of pre-oxidized specimens, with a density of 5.17 g·cm$^{-3}$ (magnetite) in the case of carbon steel and 5.21 g·cm$^{-3}$ ($Cr_2O_3$) in the case of Inconel 600.

In addition to solution analysis, the change in sample weight was also measured and used to calculate the thickness loss. However, the results based on weight loss can only be regarded as semi-quantitative because measured weight losses were ≤1 mg. The semi-quantitative results based on the weight loss were generally of the same order of magnitude as those based on the chemical analysis, but the latter can be considered more accurate and reliable.

Microscopic observations showed no change in the appearance of specimens with bare (original) or pre-oxidized surfaces as a result of the exposure.

Example 11

The results of Examples 1 through 8 showed that, in measurements of the extent of dissolution of deposit constituents (sand+boehmite or sand+boehmite+magnetite) in cleaning solutions, TMAH solutions were more effective than DMA solutions, especially with respect to the dissolution of boehmite. The effectiveness of TMAH was attributed to the fact that TMAH is a strong base, and therefore its solutions are more basic than those of DMA. In order to verify this assumption, solutions of TMAH were compared with those of the similarly strong base choline hydroxide (CholOH). Mixtures of 0.06 g sand+0.06 g boehmite or 0.06 g sand+0.06 g boehmite+0.68 g magnetite were exposed to volumes of 40 mL of several solutions of TMAH or CholOH for 48 hours at a temperature of 80° C. Each experiment was carried out in duplicate. The spent test solutions were analyzed to determine the concentrations of dissolved Si, Al, and Fe and the percentage of each of the corresponding oxides in the test solutions was calculated. The results are shown in Table 11.

TABLE 11

| | | % Dissolution | | | |
|---|---|---|---|---|---|
| Solution | Solid | $SiO_2$ | AlOOH | $Fe_3O_4$ | Combined Oxides |
| 0.15% TMAH | Sand + Boehmite | 0.084 | 52.13 | n.a. | 26.11 |
| 0.2% CholOH | Sand + Boehmite | 0.080 | 52.25 | n.a. | 26.16 |
| 5% TMAH + 1% EDTA | Sand + Boehmite | n.d. | 86.01 | n.a. | 43.01 |
| 5% CholOH + 1% EDTA | Sand + Boehmite | n.d. | 88.47 | n.a. | 44.24 |
| 0.15% TMAH | Sand + Boehmite + Magnetite | 0.065 | 52.10 | 0.043 | 3.95 |
| 0.2% CholOH | Sand + Boehmite + Magnetite | 0.079 | 43.81 | 0.026 | 3.31 |
| 5% TMAH + 1% EDTA | Sand + Boehmite + Magnetite | n.d. | 82.49 | 0.032 | 6.21 |
| 5% CholOH + 1% EDTA | Sand + Boehmite + Magnetite | n.d. | 84.65 | 0.017 | 6.36 | n.d. = not determined (due to contamination)
n.a. = not applicable (no magnetite introduced)

The results in Table 11 showed that TMAH and CholOH exhibit comparable effectiveness in dissolving the deposit constituents considered, indicating the effectiveness of TMAH as a cleaning agent for steam generator deposits is a consequence of its high base dissociation constant, rather than a reflection of its specific chemical structure. Thus, other quaternary ammonium hydroxides identified and implied above are equally relevant to the present invention disclosed herein and the example embodiments involving TMAH and CholOH are should not be interpreted as limiting the scope or applicability of the preventing invention. Consistent with previous examples, the results summarized in Table 11 confirmed that boehmite was significantly more soluble than silica or magnetite in the solutions evaluated. The extent of dissolution of boehmite increased by a factor of approximately 1.7 when the concentration of the base (TMAH or CholOH) was raised from 0.15-0.2 wt % to 5 wt %.

Each of the references cited, supra, is hereby incorporated, in its entirety, by reference and for all purposes.

We claim:

1. A method of conditioning and removing deposits including mixtures of inorganic compounds comprising, in sequence, the steps of:
    a) taking a heat exchange system of a nuclear power plant out of service, the heat exchange system including a steam generator having thereon scale comprising a mixture of anhydrous or hydrated oxides of iron and deposits of anhydrous and/or hydrated oxides and/or hydroxides of aluminum and/or silicon;
    b) introducing into the steam generator an aqueous cleaning solution comprising a treatment concentration of a quaternary ammonium hydroxide, wherein a room-temperature pH of the aqueous cleaning solution is at least 7;
    c) dissolving the deposits of anhydrous and/or hydrated oxides and/or hydroxides of aluminum and/or silicon through a chemical reaction between the quaternary ammonium hydroxide and the deposits of anhydrous and/or hydrated oxides and/or hydroxides of aluminum and/or silicon by contacting the deposits of anhydrous and/or hydrated oxides and/or hydroxides of aluminum and/or silicon with the aqueous cleaning solution for a treatment period;
    d) maintaining the aqueous cleaning solution within a treatment temperature range during the treatment period;
    e) removing the dissolved deposits and substantially all of the aqueous cleaning solution from the steam generator after the treatment period; and
    f) returning the heat exchange system to service,
    wherein the method further comprises:
        estimating a total deposit load of the deposits of anhydrous and/or hydrated oxides and/or hydroxides of aluminum and/or silicon; and
        adjusting the quantity of quaternary ammonium hydroxide in the aqueous cleaning solution to achieve a target molar ratio relative to the total deposit load.

2. The method of conditioning and removing deposits according to claim 1 wherein:
    the aqueous cleaning solution further comprises a component selected from the group consisting of chelants, complexants, organic acids and mixtures thereof.

3. The method of conditioning and removing deposits according to claim 2 wherein:
the aqueous cleaning solution further comprises an additional component selected from the group consisting of reductants, oxidants, pH control or stabilizing agents, corrosion inhibitors, non-ionic surfactants and mixtures thereof.

4. The method of conditioning and removing deposits according to claim 1 wherein:
the quaternary ammonium hydroxide is selected from the group consisting of tetra-alkyl ammonium hydroxides, choline hydroxide and mixtures thereof.

5. The method of conditioning and removing deposits according to claim 1 wherein:
the aqueous cleaning solution further comprises a chelant selected from the group consisting of EDTA, HEDTA, lauryl substituted EDTA, organic acids and mixtures thereof.

6. The method of conditioning and removing deposits according to claim 1 wherein;
a) the treatment concentration of the quaternary ammonium hydroxide in the aqueous cleaning solution is between 0.0001% and 15 wt %; and
b) the treatment temperature is below a thermal decomposition temperature of the quaternary ammonium hydroxide.

7. The method of conditioning and removing deposits according to claim 1, further comprising:
agitating the aqueous cleaning solution for at least a portion of the treatment period wherein the agitation is achieved by a method selected from the group consisting of flow induced mixing, inert gas sparging, pressure pulsing and combinations thereof.

8. The method of conditioning and removing deposits according to claim 1, wherein:
the target molar ratio is at least 1:1.

9. The method of conditioning and removing deposits according to claim 1, further comprising:
modifying the treatment concentration over the course of the treatment period.

10. The method of claim 1, wherein the room-temperature pH of the aqueous cleaning solution is at least 9.

11. A method of conditioning and removing deposits comprising the steps of:
a) forming a first aqueous cleaning solution comprising a treatment concentration of a component selected from the group consisting of chelants, complexants, organic acids and mixtures thereof;
b) contacting the deposits with the first aqueous cleaning solution for a first treatment period to produce conditioned deposits;
c) removing substantially all of the first aqueous cleaning solution after the first treatment period;
d) forming a second aqueous cleaning solution comprising a treatment concentration of a quaternary ammonium hydroxide, wherein a room-temperature pH of the second aqueous cleaning solution is at least 7;
e) after c), contacting the conditioned deposits with the second aqueous cleaning solution for a second treatment period;
f) maintaining the second aqueous cleaning solution within a treatment temperature range during the second treatment period; and
g) removing substantially all of the second aqueous cleaning solution after the second treatment period.

12. The method of conditioning and removing deposits according to claim 11, further wherein: the first aqueous cleaning solution includes a chelant selected from the group consisting of EDTA, HEDTA, lauryl substituted EDTA and mixtures thereof.

13. The method of claim 11, wherein the room-temperature pH of the aqueous cleaning solution is at least 9.

14. The method of claim 11, further comprising, during e), dissolving deposits of anhydrous and/or hydrated oxides and/or hydroxides of aluminum and/or silicon through a chemical reaction between the quaternary ammonium hydroxide and the deposits of anhydrous and/or hydrated oxides and/or hydroxides of aluminum and/or silicon by contacting the deposits of anhydrous and/or hydrated oxides and/or hydroxides of aluminum and/or silicon with the second aqueous cleaning solution for the second treatment period.

15. A method of conditioning and removing deposits including mixtures of inorganic compounds comprising, in sequence, the steps of:
a) taking a heat exchange system of a nuclear power plant out of service, the heat exchange system including a steam generator having thereon scale comprising a mixture of anhydrous or hydrated oxides of iron and deposits of anhydrous and/or hydrated oxides and/or hydroxides of aluminum and/or silicon;
b) introducing into the steam generator an aqueous cleaning solution comprising a treatment concentration of a quaternary ammonium hydroxide, wherein a room-temperature pH of the aqueous cleaning solution is at least 7;
c) dissolving the deposits of anhydrous and/or hydrated oxides and/or hydroxides of aluminum and/or silicon through a chemical reaction between the quaternary ammonium hydroxide and the deposits of anhydrous and/or hydrated oxides and/or hydroxides of aluminum and/or silicon by contacting the deposits of anhydrous and/or hydrated oxides and/or hydroxides of aluminum and/or silicon with the aqueous cleaning solution for a treatment period;
d) maintaining the aqueous cleaning solution within a treatment temperature range during the treatment period;
e) removing the dissolved deposits and substantially all of the aqueous cleaning solution from the steam generator after the treatment period; and
f) returning the heat exchange system to service,
wherein the method further comprises:
estimating a combined amount of the deposits of anhydrous and/or hydrated oxides and/or hydroxides of aluminum and/or silicon in the steam generator,
wherein said introducing into the steam generator the aqueous solution comprises introducing a molar amount of the quaternary ammonium hydroxide that is between 2 and 20 times the estimated combined amount of the deposits.

* * * * *